United States Patent Office 3,169,862
Patented Feb. 16, 1965

3,169,862
PROCESS FOR MAKING ANODES FOR
ELECTROLYTIC CONDENSERS
Walter Scheller, Muenchenstein, Switzerland, assignor to Ciba Limited, Basel, Switzerland, a company of Switzerland
No Drawing. Filed Jan. 9, 1962, Ser. No. 165,211
Claims priority, application Switzerland, Jan. 10, 1961, 289/61
5 Claims. (Cl. 75—207)

The present invention provides a process for the manufacture of anodes for electrolytic condensers from sintered tantalum, niobium or from an alloy containing tantalum or niobium.

Electrolytic condensers with anodes of sintered tantalum or niobium are known. A substantial advantage of such condensers is that they are extremely compact and that very high capacity values can be achieved. At the same time, the condensers should combine a minimum of leakage current with high capacitance low loss angle (dissipation factor) and the actual capacity value of such a condenser should drop at most only very slightly with the frequency.

When a certain grade of powder is used, the capacity and the leakage current are governed, inter alia, by the moulding and sintering conditions to which the powder is subjected during the manufacture of the anode pellets. Thus, the capacity achieved in the known processes is for a given moulding pressure in general the higher the lower the temperature is kept during the sintering operation and the shorter the sintering period. On the other hand, the leakage currents are in general diminished as the sintering temperature is raised. That means that the two conditions contradict each other and make a compromise necessary since to achieve high capacities as low a sintering temperature as possible is needed while to keep the leakage currents to a minimum as high a temperature as possible must be applied. This dependence of the characteristic values of the condenser on the sintering conditions is particularly apparent in the case of fine powders with which, in general, higher capacity values calculated on the amount of metal used can be achieved.

Another point to watch in the manufacture of anodes by sintering tantalum or niobium powder is that the kind and proportion of extraneous elements present have an influence on the properties of the condensers. Among the non-metallic extraneous elements carbon and oxygen in particular impair the leakage current.

It is known that carbon and oxygen present in the tantalum metal react together at a temperature above about 1600° C. and under a high vacuum to form carbon monoxide. Furthermore, it is known to add to tantalum powder before sintering it, depending on its content of carbon and/or oxygen, either carbon or oxygen in the form of lampblack or carbide or a metal oxide with a view to lowering its content of carbon and oxygen. The amount of lampblack or carbide, or metal oxide respectively, added should be such as to correspond to the formation of carbon monoxide. When the metal powder has too high a content of oxygen, a stoichiometric amount of lampblack or carbide is added, whereupon at the sintering temperature carbon monoxide escapes. The metal pellets obtained in this manner have a considerably reduced content of oxygen and of carbon, respectively.

It has now been found that condensers of an especially high capacity and low leakage current are obtained by subjecting an oxygen-containing metal powder to a treatment with carbon or carbide having a predetermined content of oxygen.

The present invention provides a process for the manufacture of anodes for electrolytic condensers from oxygen-containing tantalum or niobium powder or tantalum and/or niobium alloy by adding the stoichiometric proportion of carbon or carbide required for the formation of carbon monoxide, moulding the material in the desired shape and sintering the pellets under vacuum at a temperature ranging from 1600 to 2200° C., said process being performed with the use of a metal powder containing 0.5 to 1.4% by weight of oxygen and the sintering operation being terminated when a carbon content below 0.015% by weight, preferably below 0.005% by weight, has been reached.

When the actual oxygen content is distinctly above or below the above-mentioned range of 0.5 to 1.4% by weight, the capacities attained are substantially lowered. Particularly good results are obtained by using a metal powder containing 0.8 to 1.2% by weight of oxygen.

The forming of the resulting sintered pellets leading to the finished anode follows the usual practice.

The use according to the invention of metal powders having a specific oxygen content gives rise to sintered spongy structures having wide pores. This is probably due to the presence of carbon or carbide which prevent the pores from closing prematurely during the sintering treatment.

To bring about this escape of carbon monoxide which coincides with the sintering, the mouldings are heated immediately and as rapidly as possible to a temperature at which the partial pressure of the carbon monoxide formed is greater than the ambient vacuum. At the range of about $10^{-5}$ to $10^{-4}$ mm. Hg, which is most advantageous for the present process, a predominance of the carbon monoxide partial pressure is observed at sintering temperatures above 1600°, especially at 1850° C.

The present invention consists in using as starting material a tantalum or niobium powder having an oxygen content of 0.5 to 1.4%, that is to say of 5,000 to 14,000 parts per million. This powder is mixed with carbon in an amount of 60 to 100% of that which is stoichiometrically needed for the formation of carbon monoxide so that the finished, sintered anode body retains only a very small amount of carbon. This is of advantage to the leakage current of the finished condenser because above a certain, very low threshold value its size increases very steeply as the carbon content rises. Thus, though the material still has a residual content of oxygen, this proportion of oxygen is so small that it does not really constitute a disturbing factor.

The carbon may be added to the sinter metal in its pure form as carbon or graphite or in the form of carbide. To ensure that the escape of carbon monoxide formed in the powder coincides with the sintering so as to keep the pores open, the metal powder adjusted to the stoichiometrically correct content of carbon and oxygen is raised immediately, that is to say as rapidly as possible, to the sintering temperature. To expel any hydrogen that may be present in the metal—which is the case, above all, when instead of the metal its hydride is used—first the anodes are heated relatively slowly under a high vacuum in the course of ½ to 2 hours to about 800° C., that is to say to a temperature well below the level at which the formation of carbon monoxide sets in. The temperature gap from the dehydrogenation temperature (about 800° C.) to the sintering temperature (above 1600° C.) is then bridged very rapidly, that is to say within about 15 minutes at most. The frequently used stepwise sintering is not required in this case.

Sintering is brought to an end as soon as the content of carbon has dropped to a predetermined limit value. The relevant sintering time required for any specific starting material is easy to determine by a preliminary test run. In general, the carbon content should not exceed 150 parts per million, and it is preferably below 50 parts per million. The oxygen content of the completely sintered material is then below 1500 parts per million and is at most 2000 parts per million. In general, the aforementioned carbon content is attained at a sintering temperature ranging from 1600 to 2200° C. within a sintering time of less than one hour. The sintered pellets are then cooled in an inert atmosphere or under a high vacuum, and the anodes are then formed by one of the usual methods.

The particle size of the metal powder used should be below 150μ, though it is also possible to sinter metal powders of a substantially greater fineness and in such a case, as mentioned above, a higher capacity-to-weight ratio is achieved without an undesirable increase of the leakage current and the loss angle. It is of advantage when the starting material has a particle share of at least 80% smaller than 80μ and of at least 60% smaller than 60μ.

Particularly suitable starting materials are tantalum or niobium powders having a dendritic particle form with a bulk weight of about 1.5 to 6 grams per cubic centimeter. The amount of contaminants—transition metals—should not exceed a given limit value which, for transition metals having a boiling point below 2800° C. is about 100 parts per million, and for transition metals having a boiling point above 2800° C. should not exceed 50 parts per million. After having had its contents of carbon and oxygen adjusted as described above, the material is moulded in the form required for the anode pellets, having a specific gravity of about 4 to 7. After sintering, the pellets have a specific gravity of about 6 to 11 and a porosity better than 40% (calculated from the ratio of specific gravity to solid metal).

The high porosity resulting from the spongy nature of the finished product makes the anodes particularly suitable for condensers of the solid electrolyte type, for example those in which the formed anode is impregnated with manganese dioxide. Sintering is also accompanied by recrystallization and a growth of the grain without the particles growing together into a compact sintered body. The growth of the particles reduces the number of defects and grain boundaries and on formation very uniform layers are produced so that leakage currents are reduced and the results achieved over a long period are improved.

The high capacities and low leakage currents obtained by the present process can also be attained with very fine powders having a particle size from 0.1 to about 10μ. By virtue of their fineness such powders require for a certain capacity an amount of metal only half that needed for anodes made from a coarser powder.

Example 1

The starting product used was tantalum powder having a dendritic structure and a grain size distribution as follows: 20% from 150 to 60μ, 20% from 60 to 40μ, and 60% below 40μ. The oxygen content was 8350 parts per million; the total content of transition metals was 0.007% by weight; the content of tungsten and molybdenum was below 20 parts per million. The bulk weight of the powder was 2.5 grams per cubic centimeter.

200 grams of the powder as described were mixed with 1.2 grams of carbon in the form of lampblack. This mixture was moulded in a tablet press to form cylindrical pellets of 2.9 mm. diameter and 5.1 mm. length, having a specific gravity of 4.8.

The pellets were freed from hydrogen by being heated in the course of one hour to 800° C., then raised within 7 minutes from 800° C. to 1750° C. and heated for 30 minutes at 1750° C., and thereupon sintered under a vacuum of $10^{-5}$ mm. Hg and cooled under vacuum. The sintered pellets contained 12 parts per million of carbon.

The resulting pellets were formed in known manner at 90° C. and 120 volts in a solution of orthophosphoric acid of 0.01% strength, and the formation was then completed at the same voltage. Measured in orthophosphoric acid solution of 10% strength they displayed at 25° C. and 120 cycles a capacity in excess of 35 μf. per gram. The leakage current, measured in identical manner, was at 90 volts after 5 minutes less than $10^{-4}$ μampere per μf. v.

Example 2

Cylindrical mouldings were made as described in Example 1. During the sintering operation the temperature was raised from room temperature to 1750° C. within 10 minutes, all other conditions being identical. The capacity yield obtained amounted to 39 μf. per gram and the leakage current was 0.37 μampere per gram.

Example 3

The experiments described below demonstrate the effect of the oxygen content of the tantalum powder on the capacity yield of the sintered anodes.

The starting product used in each experiment was tantalum powder having a particle size smaller than 60μ, a bulk weight of 3.5 grams per cc., and a Fisher subsieve sizer value of 5.5.

| Oxygen content of powder: | Parts per million |
|---|---|
| No. 1 | 2,850 |
| No. 2 | 5,750 |
| No. 3 | 11,350 |
| No. 4 | 13,950 |
| No. 5 | 17,300 |

These powders were mixed with the following percentages by weight of high-purity lampblack.

| Powder: | Percent of lampblack |
|---|---|
| No. 1 | 0.2 |
| No. 2 | 0.42 |
| No. 3 | 0.85 |
| No. 4 | 1.0 |
| No. 5 | 1.20 |

Cylindrical mouldings of 2.9 mm. diameter and 5.1 mm. length were made from the above powder mixtures; the specific gravity of the mouldings was 5.4. The pellets were heated under a vacuum of $5 \cdot 10^{-4}$ to $3 \cdot 10^{-5}$ mm. Hg, within 15 minutes to 1750° C. (uncorrected pyrometer values, without taking into consideration the absorption in the spy glass) and then maintained at this temperature for 50 minutes. The sintered pellets were then cooled under a high vacuum.

Measurement of the electric data followed the method described in Example 1 and revealed the following values.

| Powder: | Capacity yield in μf./gram |
|---|---|
| No. 1 | 23.4 |
| No. 2 | 28.7 |
| No. 3 | 36.1 |
| No. 4 | 32.5 |
| No. 5 | 21.9 |

It is surprising to observe that the capacity yield passes a maximum between 5,000 and 14,000 parts per million of oxygen.

Example 4

The starting product in this experiment was a niobium powder of a grain size below 60μ with an oxygen content of 1.35% by weight and a carbon content of 0.06% by weight. This powder was mixed with 0.9% of lampblack and the mixture compressed into a cylindrical form having a diameter of 2.7 mm. and a length of 7.7 mm. The specific weight of the compressed anodes was 2.5 gr./gm.$^3$. In the course of 10 minutes, the green pellets were heated to 1750° C. (uncorrected pyrometer value) under a vacuum of $10^{-3}$ to $5 \cdot 10^{-5}$, and maintained at that temperature for one hour. They were then cooled to room temperature under a high vacuum. At 25° C., the sintered anodes were formed with 60% acetic acid at 120 volts, and the formation completed at this voltage in the course of 3 hours. The capacity, the loss angle, and the leakage currents were measured in 10% phosphoric acid at room temperature and the following values obtained:

Capacity yield _____ 52 µf./g.
Leakage current _____ 6% at 120 cycles.
Loss angle _____ $1.1 \cdot 10^{-2}$ µa./µc.

What is claimed is:

1. A process for the manufacture of sintered anodes for electrolytic condensers from a metal powder of a particle size below 150 microns containing from 0.5 to 1.4 percent by weight of oxygen and at most one further gaseous element, namely hydrogen, said powder being selected from the group consisting of niobium, tantalum and alloys thereof, the process comprising the steps of (A) mixing said metal powder with a carbon-containing product in the proportion of from 60 to 100 percent of the stoichiometric amount required for the formation of carbon monoxide, the carbon-containing product being selected from the group consisting of carbon and carbide which carbide is selected from the group consisting of tantalum carbide and niobium carbide, (B) pressing the powder into the desired anode shape, and (C) sintering it in a high vacuum at temperatures ranging from 1600 to 2200° C. until the carbon content has been reduced to below 0.015 percent by weight.

2. A process for the manufacture of sintered anodes for electrolytic condensers from niobium powder of a particle size below 150 microns containing from 0.5 to 1.4 percent by weight of oxygen and at most one further gaseous element, namely hydrogen, the process comprising the steps of (A) mixing said niobium powder with niobium carbide in the proportion of from 60 to 100 percent of the stoichiometric amount required for the formation of carbon monoxide, (B) pressing the powder into the desired anode shape, and (C) sintering it in a high vacuum at temperatures ranging from 1600 to 2200° C. until the carbon content has been reduced to below 0.015 percent by weight.

3. A process for the manufacture of sintered anodes for electrolytic condensers from tantalum powder of a particle size below 150 microns containing from 0.5 to 1.4 percent by weight of oxygen and at most one further gaseous element, namely hydrogen, the process comprising the steps of (A) mixing sand tantalum powder with tantalum carbide in the proportion of from 60 to 100 percent of the stoichiometric amount required for the formation of carbon monoxide, (B) pressing the powder into the desired anode shape, and (C) sintering it in a high vacuum at temperatures ranging from 1600 to 2200° C. until the carbon content has been reduced to below 0.015 percent by weight.

4. A process for the manufacture of sintered anodes for electrolytic condensers from niobium powder of a particle size below 150 microns containing from 0.5 to 1.4 percent by weight of oxygen and at most one further gaseous element, namely hydrogen, the process comprising the steps of (A) mixing said metal powder with carbon in the proportion of from 60 to 100 percent of the stoichiometric amount required for the formation of carbon monoxide, (B) pressing the powder into the desired anode shape, and (C) sintering it in a high vacuum at temperatures ranging from 1600 to 2200° C. until the carbon content has been reduced to below 0.015 percent by weight.

5. A process for the manufacture of sintered anodes for electrolytic condensers from tantalum powder of a particle size below 150 microns containing from 0.5 to 1.4 percent by weight of oxygen and at most one further gaseous element, namely hydrogen, the process comprising the steps of (A) mixing said metal powder with carbon in the proportion of from 60 to 100 percent of the stoichiometric amount required for the formation of carbon monoxide, (B) pressing the powder into the desired anode shape, and (C) sintering it in a high vacuum at temperatures ranging from 1600 to 2200° C. until the carbon content has been reduced to below 0.015 percent by weight.

References Cited in the file of this patent

UNITED STATES PATENTS

| 1,011,708 | Appelberg | Dec. 12, 1911 |
| 1,034,018 | Lederer | July 30, 1912 |
| 2,929,133 | Hughes | Mar. 22, 1962 |

FOREIGN PATENTS

| 12,158 | Great Britain | of 1902 |
| 816,997 | Great Britain | July 22, 1959 |

OTHER REFERENCES

Goetzel: "Treatise on Powder Metallurgy, vol. II, Interscience Publishers, Inc., New Fork, 1950, pp. 42–46, 50–54 and 56–57.